Jan. 19, 1954     H. KUEHN     2,666,243

SPRING HOOK CLASP

Filed March 8, 1950

Herman Kuehn,
Inventor,
Haynes and Koenig,
Attorneys.

Patented Jan. 19, 1954

2,666,243

UNITED STATES PATENT OFFICE 2,666,243

SPRING HOOK CLASP

Herman Kuehn, Union, N. J., assignor to Gemex Company, Union, N. J., a corporation of New Jersey Application March 8, 1950, Serial No. 148,351

3 Claims. (Cl. 24—234)

This invention relates to spring hook clasps, and more particularly to such clasps for connecting a wrist watch bracelet and a wrist watch.

One object of the invention is the provision of a spring hook type of clasp which is particularly suitable for use on the ends of a wrist watch bracelet to connect the bracelet and a wrist watch, of such construction as to be easily applicable to and removable from bracelet-end-attaching members on different watches, whereby a bracelet equipped at its ends with clasps of this invention may be used with various watches. A further object is the provision of a clasp construction which is adapted for the production of a clasp of ornamental character.

In general, a clasp of this invention comprises a cap which is adapted for attachment to an end of a wrist watch bracelet. A stud has a head fixed in the cap by inturned portions of flanges on the cap. Pivoted on this stud is a pair of hooks, each having a tongue at its free end projecting toward the other hook. The tongues of the two hooks overlap in a closed position of the hooks. Each hook has a shoulder at its pivot end. The stud holds in place a two-part spring housing. The hooks are biased toward one another to closed position by a helical coiled compression spring in the housing, the spring being bent in an arc around the stud and acting against the shoulders. The tongues of the hooks are adapted to enter an eye on a wrist watch to connect the bracelet and the watch. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a top plan view of a clasp of this invention, with its hooks closed;

Similar reference characters indicate corresponding parts throughout the several views of the drawing.

Figure 6:
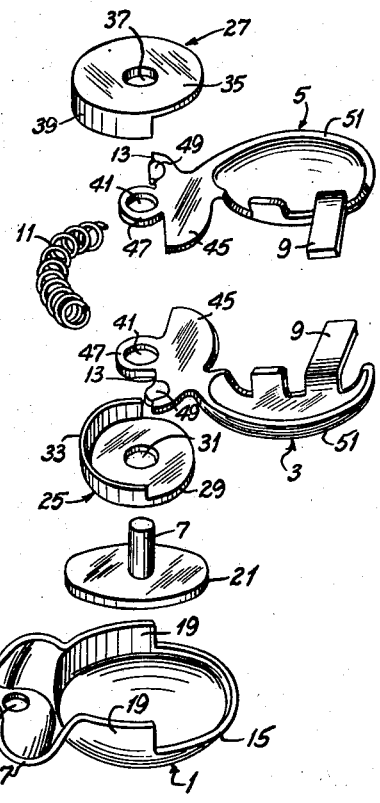
Fig. 6 is an exploded perspective of all the parts of the clasp.

In Fig. 6, part 5 is shown above part 3, though in assembly their relation is the opposite, for purposes of better illustrating how these parts appear when finally assembled.

Figure 1:
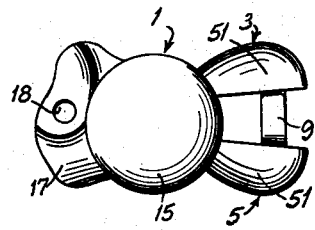
Figure 3:
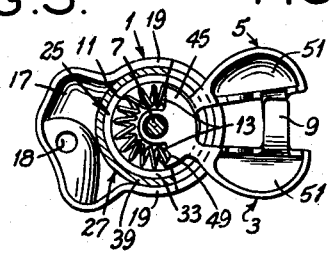
Fig. 3 is a section on line 3—3 of Fig. 2.
Figure 4:
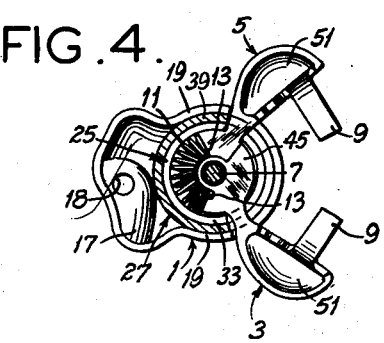
Fig. 4 is a section similar to Fig. 3, illustrating the hooks of the clasp open.

Referring to the drawing, a clasp constructed in accordance with this invention is shown to comprise a member 1 adapted to be attached at one end to an end of a wrist watch bracelet (not shown), and a pair of clasp hooks 3 and 5 pivoted on a stud 7 under the member 1 and projecting beyond the other end of the member 1. The hooks are biased to the closed position illustrated in Figs. 1 and 3 wherein tongues 9 at the free ends of the hooks are in overlapping relation, one above the other, by coiled compression spring means consisting of a single helical compression spring 11, the ends of which are engaged with shoulders 13 on the hooks. The arrangement is such that the hooks may be opened by spreading them apart, the spring 11 thereupon being compressed between the shoulders on the hooks, as illustrated in Fig. 4.

More particularly, the member 1 consists of a sheet metal stamping having a cap portion 15 provided with an ear 17 having an aperture 18 for receiving a fastener for connecting the member to the end of a bracelet. The cap 15 is provided at its opposite edges adjacent the ear 17 with flanges 19 which project downward, i. e., they project toward the wrist when the bracelet is worn. The hooks 3 and 5 project out from under the cap 15 opposite the ear 17. As herein illustrated, the member 1 is formed particularly for attachment to the end link of an expansible bracelet chain, and is of such structural and ornamental character as to be attachable to the end link and to harmonize ornamentally with the bracelet. If desired, the cap 15 may be faceted or otherwise ornamented.

Figure 5:
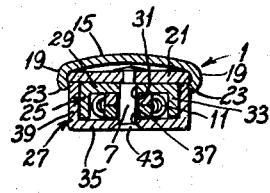
Fig. 5 is a section on line 5—5 of Fig. 2.
Figure 2:
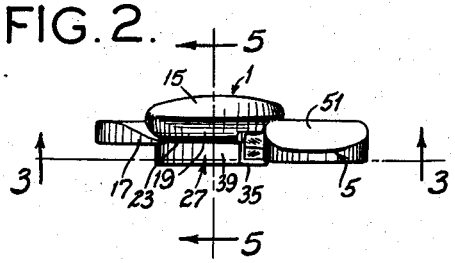
Fig. 2 is an elevation of Fig. 1.

The stud 7 projects downward under the cap. Its upper end as viewed in Fig. 5 is staked in a head 21 which fits in the cap and which is held therein by crimping the flanges 19 of the cap as indicated at 23. The hooks 3 and 5 are pivoted at their inner ends, one upon the other, on the stud 7 within a two-part spring housing consisting of housing members 25 and 27. Housing member 25 comprises a disc 29 having a central aperture 31 and a peripheral flange 33 extending around somewhat more than half its periphery. Housing member 27 comprises a disc 35 slightly larger than disc 29 having a central aperture 37 and a peripheral flange 39 of the same arcuate extent as the flange 33.

The housing member 25 is assembled with the member 1 with its disc portion 29 engaged against the head 21 of the stud 7 and its flange 33 extending outward away from the member 1, and with the stud extending through its central aperture 31. The inner ends of the hooks 3 and 5 are apertured as indicated at 41 to receive the stud. The hooks are mounted in opposed relation in such manner that their shoulders 13 are on opposite sides of the stud. The spring 11 is bent into an arc to fit in the space between the stud and the flange 33 of housing member 25, the ends of the spring being engaged with the shoulders 13. Housing member 27 has its flange 39 extending toward the member 1 telescoped on the outside of flange 33 of the housing member 25, with the outer end portion of stud 7 extending through the central aperture 37 in its disc portion 35. The outer end of the stud is upset as indicated at 43 in Fig. 5 to hold the parts in assembled relation.

The hooks 3 and 5 are formed to present a similar appearance when viewed from above the cap 15, with one the reverse of the other for their mounting in opposed relation. Each consists of a sheet metal stamping and has a flat inner end portion 45 on which is a flat ear 47. The pivot aperture 41 for the hook is in this ear. The flat 45 is of such outline as to have an edge on one side of the ear forming the spring abutment shoulder 13. The flat is struck in the stamping operation at a point along this edge to provide a spring-centering lug 49 projecting from the shoulder into the end of the spring 11.

Extending outward from the flat 45 approximately at right angles to the shoulder 13 is a hollow domed arm 51 of ornamental aspect. The hooks are mounted on the stud 7 with the open sides of their arms 51 facing away from the cap 15. The tongue 9 of each hook consists of a tongue section of the blank from which the hook is stamped bent to project generally at right angles to the arm in a plane perpendicular to the pivot axis of the hooks. The flats 45 of the hooks reach out from under the rim of the cap 15, the inner ends of the arms 51 lying just outside the rim. The tongues 9 are bent so that when the hooks are pivoted on the stud, the tongue on the hook 3 will slide under the tongue on the hook 5.

The hooks may be swung apart against the bias of the spring 11 to the limiting position determined by their engagement with the ends of flanges 19 (Fig. 4), in which position the tongues 9 are separated for application to the eye on a watch. Upon release, the spring snaps the hooks to closed position wherein tongues 9 overlap, one upon the other, with the end of the tongue on one hook engaging the arm 51 of the other.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A spring hook clasp particularly for use on the ends of a wrist watch bracelet to connect the bracelet and a wrist watch, comprising a cap having an apertured ear for attaching it to a wrist watch bracelet such as an expansible link chain bracelet, said cap having flanges on its edges adjacent the ear projecting downward, a stud having a head fixed in the cap by inturned portions of the flanges, the stud extending down from the cap, a pair of hooks each having a flat inner end portion pivoted on the stud, an arm extending out from the inner end portion from under the cap, and a tongue at its outer and free end projecting toward the other hook, the tongues of the two hooks overlapping, one above the other, in a closed position of the hooks, the inner end portions of the hooks being disposed within a two-part spring housing consisting of a first housing member having an apertured disc portion mounted on the stud engaging said head and having a flange around part of its periphery projecting away from the cap, and a second housing member having an apertured disc portion mounted on the outer end of the stud and having a flange around part of its periphery projecting toward the cap and telescoped with respect to the flange of said first housing member, the outer end of the stud being upset to retain the housing on the stud, the inner end portion of each hook being formed to have a shoulder with the shoulders of the two hooks on opposite sides of the stud, and a helical coiled compression spring in the housing bent in an arc around the stud with its ends engaging the shoulders and biasing the hooks toward one another to closed position.

2. A spring hook clasp particularly for use on the ends of a wrist watch bracelet to connect the bracelet and a wrist watch, comprising a cap having an apertured ear for attaching it to a wrist watch bracelet such as an expansible link chain bracelet, said cap having flanges on its edges adjacent the ear projecting bottomward, a stud having a head fixed in the cap by inturned portions of the flanges, the stud projecting under the cap, a pair of hooks each having a flat inner end portion formed with an apertured ear pivoted on the stud, an arm extending out from the inner end portion from under the cap, and a tongue on the arm projecting toward the other hook, the tongues of the two hooks overlapping, one above the other, in a closed position of the hooks, the inner end portions of the hooks being disposed within a two-part spring housing consisting of a first housing member having an apertured disc portion mounted on the stud engaging said head and having a flange around part of its periphery projecting away from the cap, and a second housing member having an apertured disc portion mounted on the outer end of the stud and having a flange around part of its periphery projecting toward the cap and telescoped with respect to the flange of said first housing member, the outer end of the stud being upset to retain the housing on the stud, the inner end portion of each hook having an end edge constituting a spring abutment shoulder on one side of the ear, the ear projecting rearward from said edge, with the shoulders of the two hooks on opposite sides of the stud, and a helical coiled compression spring in the housing bent in an arc around the ears with its ends engaging the shoulders and biasing the hooks toward one another to closed position.

3. A clasp as set forth in claim 2 wherein each spring abutment shoulder is formed with a spring-centering lug projecting into the respective end of the spring.

HERMAN KUEHN.

References Cited in the file of this patent

UNITED STATES PATENTS

| Number | Name | Date |
|---|---|---|
| 229,885 | Henn | July 13, 1880 |
| 348,811 | Abrahams | Sept. 7, 1886 |
| 384,992 | McPherson | June 26, 1888 |
| 804,879 | Parrish | Nov. 21, 1905 |
| 931,588 | Forstner | Aug. 17, 1909 |
| 1,209,369 | Wood | Dec. 19, 1916 |
| 1,464,195 | Besaw | Aug. 7, 1923 |
| 2,234,853 | Brueggeman | Mar. 11, 1941 |

FOREIGN PATENTS

| Number | Country | Date |
|---|---|---|
| 66,365 | Switzerland | 1913 |
| 264,314 | Great Britain | Jan. 20, 1927 |
| 309,503 | Great Britain | May 15, 1930 |